United States Patent [19]

Ito et al.

[11] Patent Number: 4,972,958

[45] Date of Patent: Nov. 27, 1990

[54] MONEY RECEIVING AND DISBURSING MACHINE

[75] Inventors: Toshiaki Ito, Tokyo; Hiroshi Kinoshita, Kawaguchi; Kazuyuki Seki, Kiyose; Yukio Matsumoto, Misato, all of Japan

[73] Assignee: Laurel Bank Machines Co., Ltd., Tokyo, Japan

[21] Appl. No.: 239,399

[22] Filed: Sep. 1, 1988

[30] Foreign Application Priority Data

Sep. 4, 1987 [JP] Japan ............................... 62-221777

[51] Int. Cl.$^5$ .......................... B07C 5/34; G06F 15/30

[52] U.S. Cl. .................................... 209/534; 235/379; 902/12

[58] Field of Search ................ 209/534, 551; 194/206; 235/379; 377/8; 902/11, 12

[56] References Cited

U.S. PATENT DOCUMENTS 4,365,700 12/1982 Arimoto et al. .................... 194/206

4,511,794 4/1985 Imamichi ........................ 209/534 X 4,697,708 10/1987 Goto et al. .......................... 209/534

4,744,468 5/1988 Goi et al. ............................ 209/534

FOREIGN PATENT DOCUMENTS 0024704 3/1981 Fed. Rep. of Germany .

3519635 12/1985 Fed. Rep. of Germany .

56-33759 4/1981 Japan .

56-50460 5/1981 Japan .................................. 235/379

60-241169 11/1985 Japan .................................. 235/379

*Primary Examiner*—Margaret A. Focarino
*Assistant Examiner*—Edward M. Wacyra
*Attorney, Agent, or Firm*—Fleit, Jacobson, Cohn, Price, Holman & Stern

[57] ABSTRACT

A money receiving and disbursing machine includes a switch for initiating a dispensing operation in which bills sorted in money cases and a money receiving and disbursing box, a first pick-out device for taking out the bills in the money cases where a quantity of the bills in the money cases is more than a predetermined value after the switch is turned on, a first discriminating device for discriminating the bills from the money cases, a second pick-out device for taking out the bills in the box where the quantity of the bills in the money cases is not more than the predetermined value after the switch is turned on, a second discriminating device discriminating the bills from the box, a conveying device for conveying normal bills to a transaction window, for rejecting abnormal bills in accordance with a result of the first discriminating device, and for conveying normal bills to the money cases of corresponding denominations and for rejecting abnormal bills in accordance with a result in the second discriminaitng device, and a controller for counting the quantity of the normal bills conveyed by the coveying device to stop an operation of the first pick-out device when the quantity of the normal bills is an exact quantity for a set of bills and for counting the quantity of bills to the money cases from the box to stop an operation of the second pick-out device when the quantity of bills in the money cases reaches the predetermined quantity.

7 Claims, 6 Drawing Sheets

MONEY RECEIVING AND DISBURSING MACHINE

BACKGROUND OF THE INVENTION

1. Field of the Invention

The present invention relates to a money receiving and disbursing machine for receiving and disbursing bank notes, more specifically to a money counting and adjusting device of the money receiving and disbursing machine for counting and adjusting moneys stored in the machine.

2. Description of the Prior Art

In financial companies or agencies, moneys stored in a money receiving and disbursing machine are taken out from the machine, counted and adjusted after finishing the daily work.

Japanese Patent Public Disclosure No. 56-33759, laid open to the public on April 4, 1981, discloses a money receiving and disbursing machine comprising a plurality of money cases for one thousand yen bill, five thousand yen bill and ten thousand yen bill and a removable money case for storing all kinds of bank notes. According to the disclosure, when the daily work finished, a switch is operated so that moneys stored in the machine are introduced into the removable money case from the respective money cases of the corresponding denominations. Then, the removable case is removed from the machine to collect the moneys therein.

It should however be noted that the above money receiving and disbursing machine is disadvantageous in that the collected moneys from the removable case are necessary to be sorted, adjusted by a predetermined quantity such as one hundred of the bill by using a suitable processing machine and the like.

SUMMARY OF THE INVENTION

It is therefore object of the present invention to provide a money receiving and disbursing machine in which moneys stored in money cases of corresponding denominations can be efficiently readjusted therein after daily work.

It is another object of the present invention to provide a money receiving and disbursing machine in which moneys stored in money cases of corresponding money cases in the machine can be adjusted by a predetermined quantity such as one hundred of the bill of respective denominations.

It is still another object of the present invention to provide a money receiving and disbursing machine in which moneys stored in a money case which stores all kind moneys in the machine can be sorted and adjusted by a set of a predetermined quantity such as one hundred of the bill of respective denominations and introducing the adjusted set of the bill to a money transaction device.

According to the present invention, the above and other features of the invention can be accomplished by a money receiving and disbursing machine comprising a plurality of money case means for storing bills of corresponding denominations, money receiving and disbursing box means for receiving and storing bills irrespective of the denominations so as to pick them out one by one, distributing means for distributing bills received in the machine to the money case means and the money receiving and disbursing box means for storing them, pick-out means for picking out and dispensing the bills in the money case means and the money receiving and disbursing box means through transaction window means and transfer means for transferring the bills in the money receiving and disbursing box means to the money case means of corresponding denominations, the improvement comprising switch means for initiating a dispensing operation in which bills stored in the money case means and the money receiving and disbursing box means, first pick-out means for picking out the bills in the money case means in the case where a quantity of the bill in the money case means is more than a predetermined value after the switch means is turned on, first discriminating means for discriminating the bills picked out from the money case means, second pick-out means for picking out the bills in the money receiving and disbursing box means in the case where the quantity of the bill in the money case means is not more than the predetermined value after the switch means is turned on, second discriminating means for discriminating the bills picked out from the money receiving and disbursing box means, conveying means for conveying normal bills to the transaction window means, for rejecting abnormal bills in accordance with a result in the first discriminating means, for conveying normal bills to the money case means of corresponding denominations and for rejecting abnormal bills in accordance with a result in the second discriminating means, and control means for counting the quantity of the normal bills conveyed by the conveying means to stop an operation of the first pick-out means when the quantity of the normal bills is an exact quantity predetermined to be dispensed from the machine as a set of the bill and for counting the quantity of the bill introduced into the money case means from the money receiving and disbursing box means to stop an operation of the second pick-out means when the quantity of the bill in the money case means reaches the predetermined quantity.

According to the present invention, the quantity of the bill in the money cases means is compared with the predetermined quantity including a predetermined allowance in addition to an exact quantity for a set of the bill to be dispensed to thereby make sure the money adjusting operation in the machine in making the set of the bill. The bills are dispensed by the set of the bill from the respective money case means of corresponding denominations. In this case, after this process, the control means is caused to distribute the bills in the money receiving and disbursing box means to the money case means of corresponding denominations.

Preferably, at a second stage of the control, the control means judges the quantity in the respective money case means with regard to the exact quantity of the set of the bill.

When the quantity of the bill in the money case means is not enough to provide the predetermined quantity including the allowance, the control means judges the quantity of the bill in the money case means with regard to the quantity including the allowance as a total quantity of the bill in the money case means and is caused to dispense a set of the bill including two or more denominations.

When the quantity of the bill in the money case means is not enough to form the set of the bill to be dispensed, the control means judges the quantity of the bill in the money case means with regard to the exact quantity for making the set of the bill as a total quantity of the bill in the money case means and is caused to dispense a set of the bill including two or more denominations.

The allowance may be decided taking account of various conditions of machine and/or bills circulating in the machine.

The above and other objects of the present invention will be apparent from the following descriptions of preferred embodiment taking reference to the accompanying drawings.

DESCRIPTION OF PREFERRED EMBODIMENTS

Figure 1:
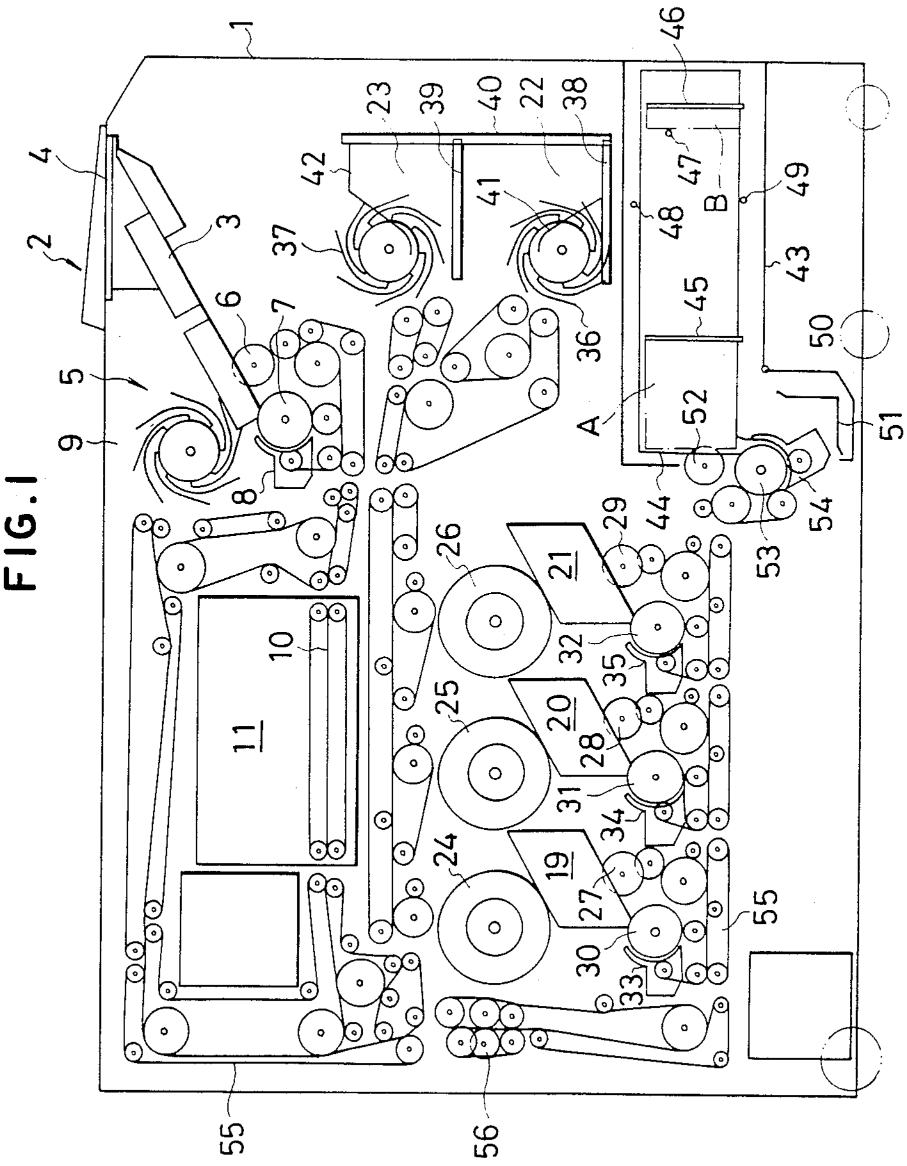
FIG. 1 is a schematic view of a money receiving and disbursing machine in accordance with the present invention.
Figure 2:
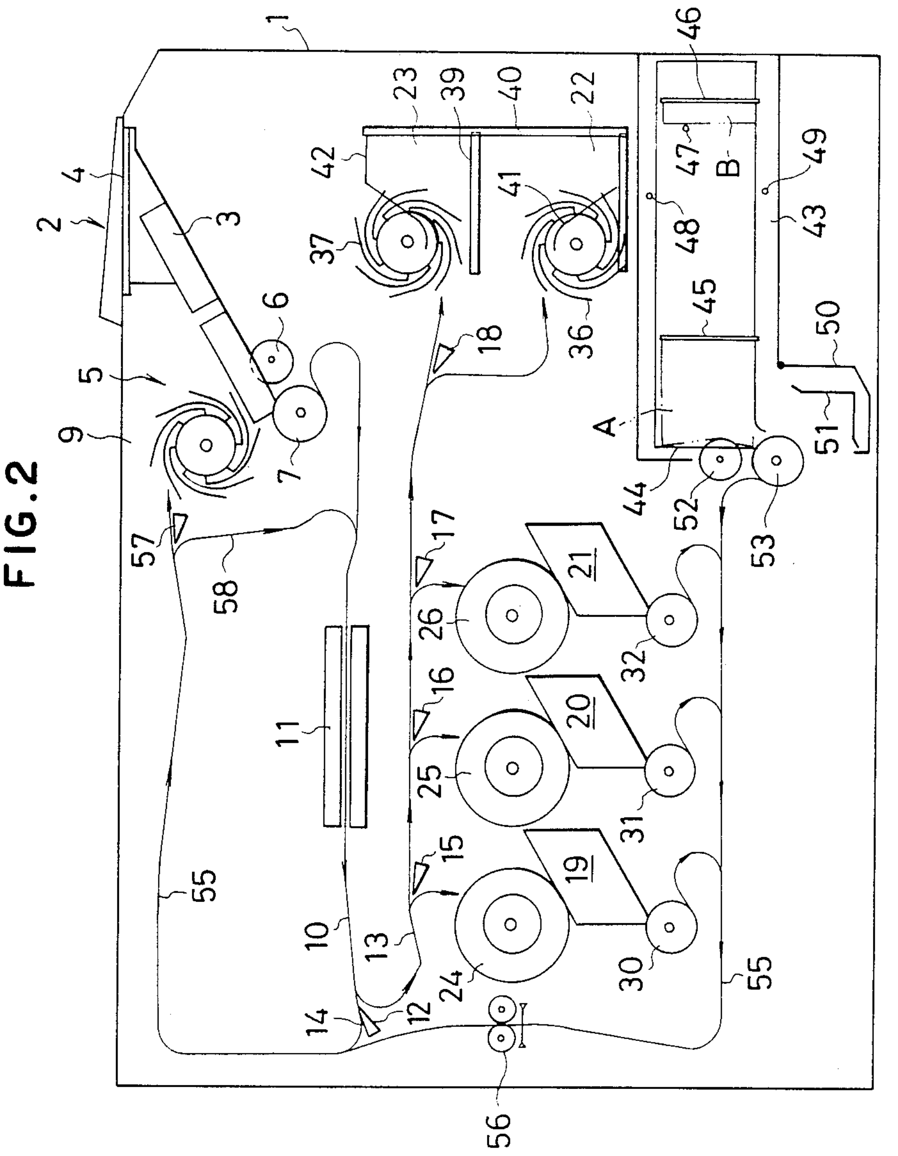
FIG. 2 is a schematic view showing money conveying routes in the machine of FIG. 1.

Referring to FIGS. 1 and 2, a money receiving and disbursing machine 1 of a money circulating type in accordance with a preferred embodiment of the present invention is provided with a transaction window device 2 having a money storing section 3, a shutter 4 for opening and closing the money storing section 3 for storing moneys received in the machine and disbursed therefrom, and a money accumulating section 5 located rearward the money storing section 3.

The accumulating section 5 is provided with a kick-out roller 6 and a pick-out roller 7 and a frictional member 8 so as to pick out bills from the money storing section 3 and convey the bills. The accumulating section 5 is further provided with an accumulating wheel 9 for accumulating bills to be disbursed.

The transaction window device 2 is provided with a partition member for dividing the money storing section 3 and the money accumulating section 5, a transfer mechanism for transferring bills between the money storing section 3 and the money accumulating section 5, and a retainer for urging received bills being conveyed against the kick-out roller 6. There is provided a money discriminating section 11 on a discriminating route 10 which transmits the received bills from the money accumulating section 5. The money discriminating section 11 is adapted to discriminate the bills received in the machine 1 and being conveyed with regard to denomination, genuineness, front and back, damage and the like and count the bills.

A distributing fork 12 is provided for distributing the bills to a distributing route 13 and the reject route 14 based on the result of the discrimination in the discriminating section 11. On the distributing route 13 are disposed four distributing forks 15, 16, 17 and 18 for distributing the bills and introducing them to a money case 19 for ten thousand yen bill, a money case 20 for five thousand yen bill, a money case 21 for one thousand yen bill, a first money storing section 22 and a second money storing section 23.

The result of the discrimination is memorized in a memory.

The retainer is adapted to separate the bills which is not judged as true bills at the discriminating section 11.

The money case 19 for ten thousand yen bill, the money case 20 for five thousand yen bill, the money case 21 for one thousand yen bill are disposed side by side horizontally and provided with accumulating wheels 24, 25, 26, kick-out rollers 27, 28, 29, pick-out rollers 30, 31, 32 and frictional members 33, 34, 35 wherein the bills are stacked at an inclined attitude. The first money storing section 22 and second money storing section 23 are disposed in an overlapped relationship with each other vertically and provided with accumulating wheels 36 and 37, bottom plates 38 and 39, a front plate 40 and guide plates 41 and 42.

The accumulating wheel 36 of the first money storing section 22 rotates in a direction opposite to the accumulating wheel 37 of the second money storing section 23. The bills are introduced downwardly into the first money storing section 22 through the accumulating wheel 36 and the guide plate 41 and accumulated on the bottom plate at an elected attitude. On the other hand, in the second money storing section 23, the bills are introduced upwardly into the second money storing section 23 through the accumulating wheel 37 and the guide plate 42 and accumulated on the bottom plate 39 at an elected attitude in which the bills are oriented opposite to the bills in the first accumulating section 22.

The bills accumulated in the first and second accumulating sections 22 and 23 are introduced into and stored in a money receiving and disbursing box 43 through an up and down movement of the sections 22 and 23.

The money receiving and disbursing box 43 is removably mounted on the machine 1 at a lower position of the first and second money storing sections 22 and 23. The money receiving and disbursing box 43 is adapted to store normal bills from the first and second money storing sections 22 and 23 in a normal bill storing section A in which the bills are stored at an elected attitude and to store damaged bills in a damaged money storing section B which is located at a rear side of the normal bill storing section A and in which the bills are stored at an elected attitude. Thus, the normal bills are held between a front plate 44 and a slidable plate 45 and the damaged bills are held between a rear plate 46 and a pair of retaining rods 47 wherein the front plate 44, the slidable plate 45 and the rear plate 46 are movably carried in a horizontal direction. Further there are provided a pair of retaining rods 48, and a pair of temporary retaining rods 49 for the normal bills.

At a front and lower side of the money receiving and disbursing box 43 is provided a pivotal door 50 on which a money receiving plate 51 of a L shaped cross section is disposed for receiving the normal bills before storing in the box 43. Further, at the front and lower side of the money receiving and disbursing box 43 are provided a kick-out roller 52 and a pick-out roller 53 and a frictional member 54 carried by the machine 1 for picking out and conveying the normal bills from the box 43.

The bills picked out one by one from the money cases 19, 20 and 21 are conveyed through a money disbursing route 55. A disbursing money discriminating section 56 is provided on the money disbursing route 55 for detecting an abnormal condition of the disbursing money such as duplication, unusual orientation and unusual conveyance pitch and the like.

When the abnormal condition is detected, the pick-out rollers 30, 31 and 32 are controlled to pick out an additional quantity of the bill corresponding to a quantity detected as an abnormal condition.

The reject route 14 is connected with the money disbursing route 55 downstream of the disbursing money discriminating section 56 and the route 55 is communicated with the accumulating wheel 9 of the accumulating section 5.

A transfer route 58 is separated from the money disbursing route 55 in the vicinity of an downstream end thereof wherein the bills can be introduced into the discriminating route 10 located at the front side of the discriminating section 11 by means of a distributing mechanism 57.

All the bills which are taken out of the box 43 and distributed and loaded on the money cases 19, 20 and 21 are transferred to the discriminating route 1? through the transfer route 58.

The memory receives informations from the discriminating section 11 and sensors(not shown) disposed in the vicinity of the pick-out rollers 30, 31 and 32 concerning the bills corresponding respective denominations to detect quantity stored in the respective money cases 19, 20 and 21 and the money receiving and disbursing box 43.

Figure 3:
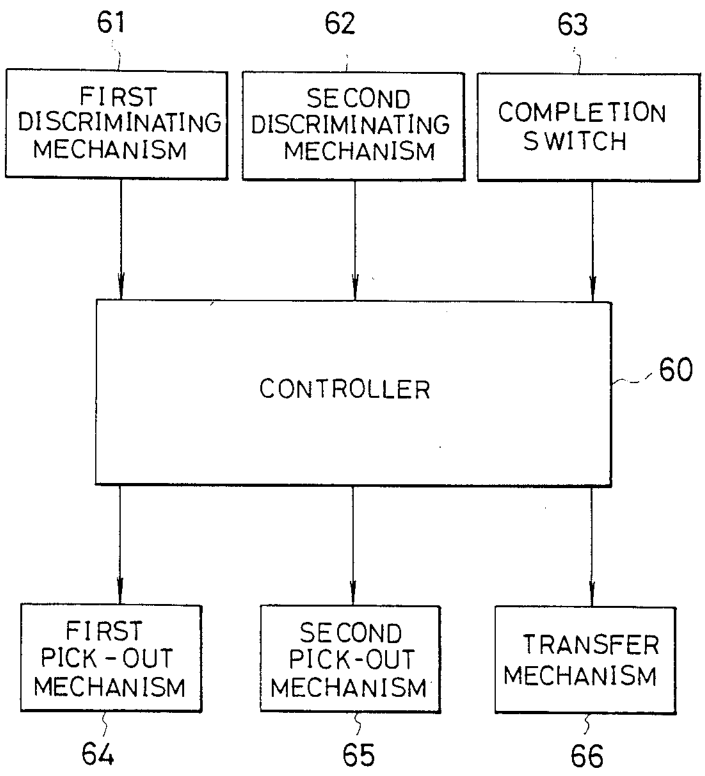
FIG. 3 is a block diagram of control devices of the machine.

Referring to FIG. 3, the machine 1 is provided with a controller 60 for controlling an operation of the machine I. The controller 60 receives signals from a first discriminating mechanism 61 constituted by the disbursing money discriminating section 56, a second discriminating mechanism 62 constituted by the discriminating section 11 and a completion switch 63 for initiating a counting and an adjusting operation of the bill stored in the machine 1 and produces control signals to a first pick-out mechanism 64 constituted by the roller 30, 31 and 32, a second pick-out mechanism 65 constituted by the pick-out roller 53 and a transfer mechanism 66 constituted by the discriminating route 10, the distributing route 13, the distributing forks 15, 16,17,18 and 57.

The machine 1 can be connected with a teller's machine so that the amount of the bill stored in the respective money cases of the machine 1 can be verified by the teller.

Hereinafter there is described a money counting and adjusting operation of the machine and the control thereof taking reference to FIG. 4(A) and 4(B).

The operation is initiated when the completion switch 63 is turned on. In this control, the bill is counted and taken out of the machine by a set of one hundred of the bill.

Figure 4A:
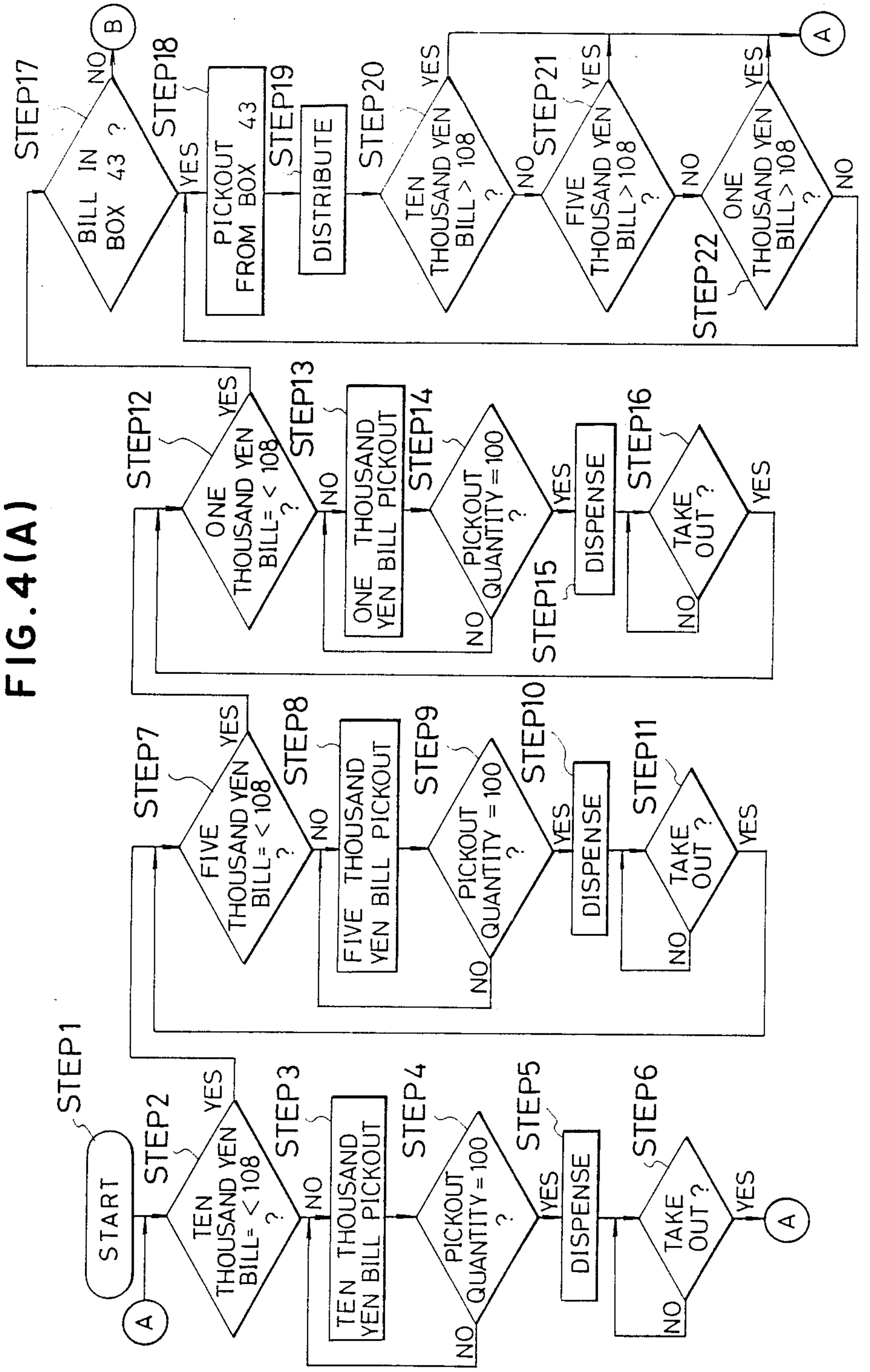
FIG. 4(A) and 4(B) are flow charts showing a control in the machine.
Figure 4B:
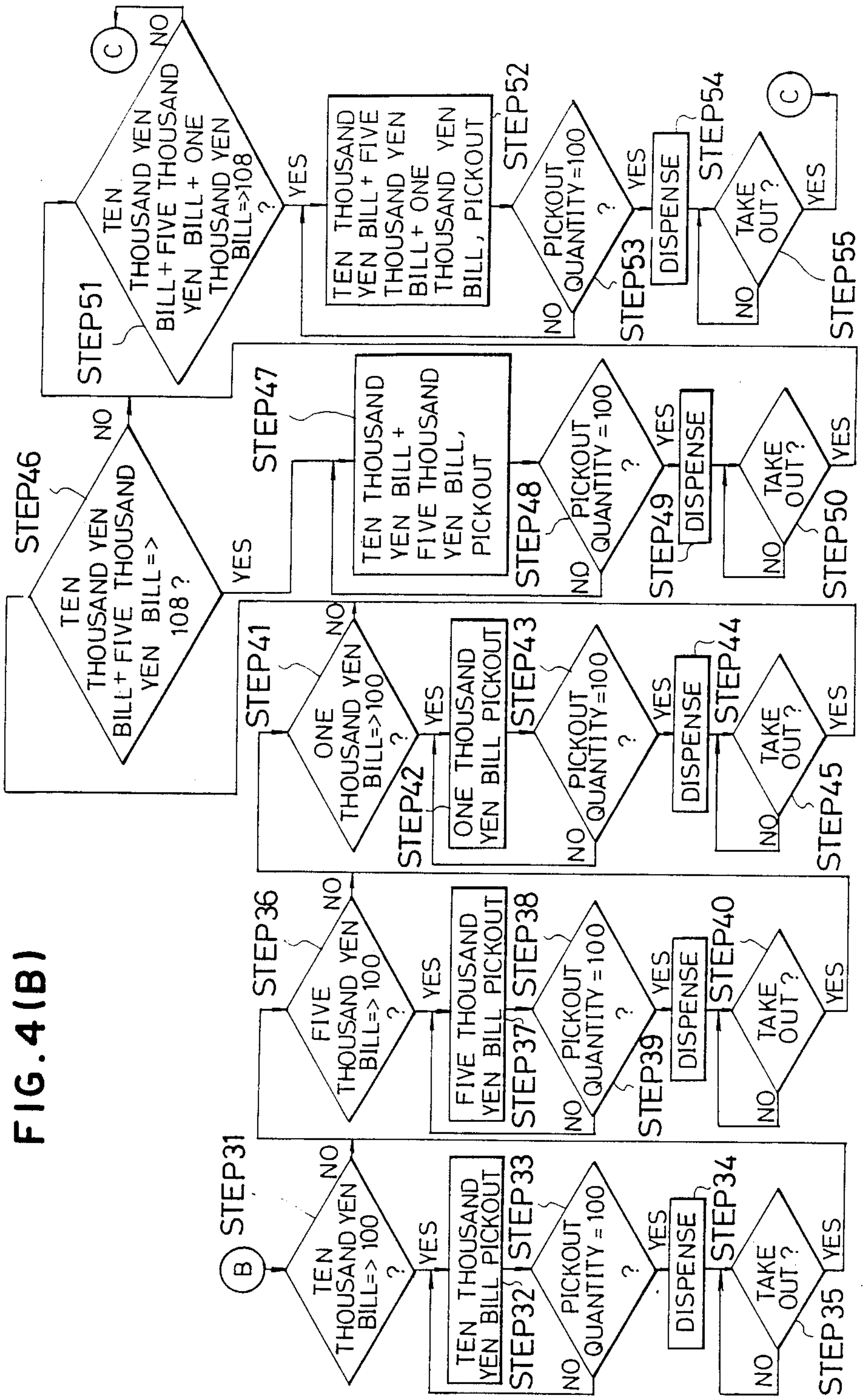
Figure 4B:
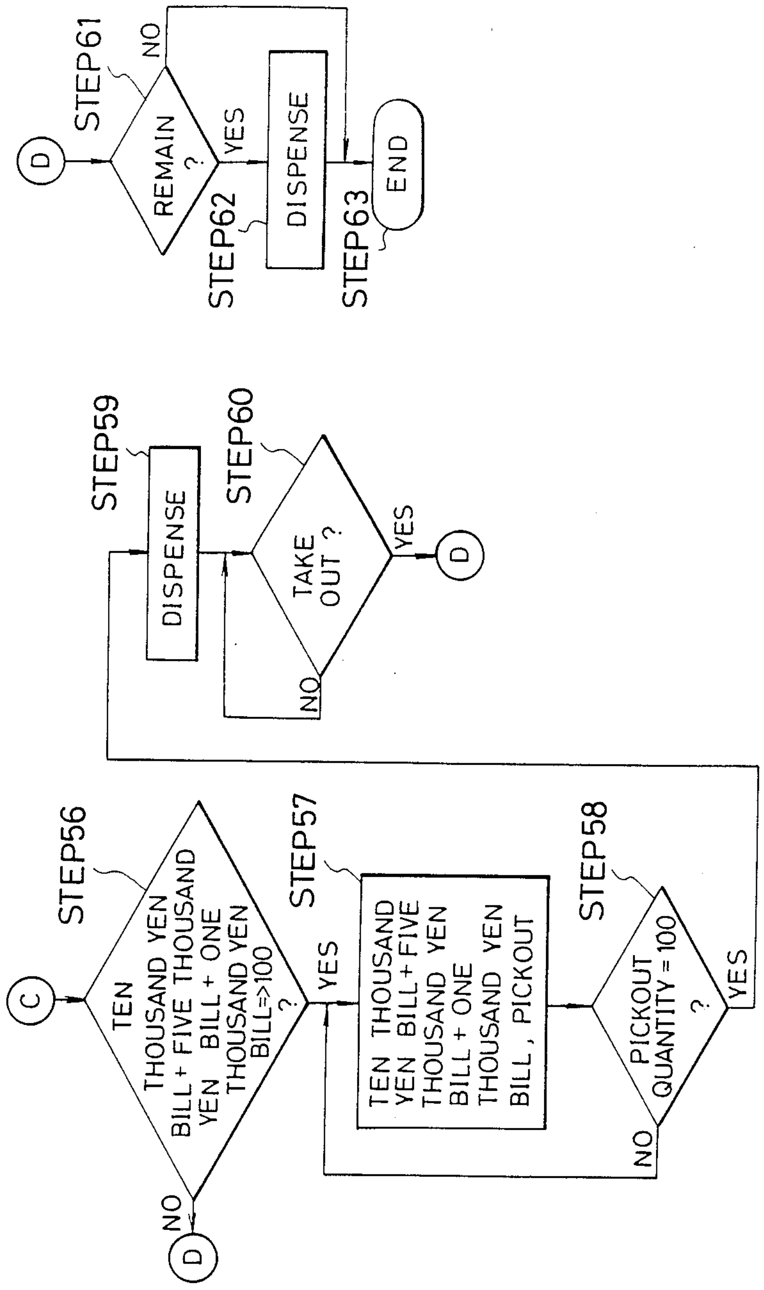

In FIG. 4(A) and 4(B), there is shown a flow of the control of the machine 1.

When the switch 63 is turned on, the control is initiated (Step 1).

The controller 60 judges based on the information from the memory as to whether or not the quantity of the bill stored in the money case 19 for the ten thousand yen bill is not more than one hundred eight. When the judgement is yes, the controller 60 carries out step 7, when no, step 3 is carried out (Step 2). In this case, it is recognized that the quantity of one hundred eight of the bill is enough to provide a set of one hundred of the bill even when a certain quantity of improper bills are included therein. In step 2, the quantity of the bill are more than one hundred eight, the controller 60 actuates the pick-out roller 30 to pick-out the bills stored in the money case 19 (Step 3). The controller 60 judges as to whether or not a quantity of the bill detected by a sensor (not shown) provided in the vicinity of the roller 30 reaches one hundred. If the judgement is yes, step 5 is carried out. When an unusual condition of bill is detected in the discriminating section 56, the bill is removed from the transfer route 55 and introduced into the damaged bill storing section B through the transfer route 58, discriminating route 10 and distributing route 13 so that the roller 30 picks out an additional quantity of the bill corresponding to the quantity of the bill detected as an unusual bill from the money case 19 for the ten thousand yen bill.

When the bills picked out of the money case 19 is conveyed to the accumulating section 5 sequentially. The section 5 is caused to transfer the stacked bills of one hundred to the receiving and disbursing money storing section 3 and open the shutter 4 (Step 5). In this storing section 3, the controller judges whether the set of one hundred of the bill are removed therefrom by an operator. If this judgement is yes, the controller 60 repeats the same procedure from the step 2.

When the controller judges that the quantity of the bill stored in the money case 19 for the ten thousand yen bill is less than one hundred eight, then the controller 60 judges as to whether the quantity of the bill stored in the money case 20 for five thousand yen bill is not more than one hundred eight.

Step 7 through step 11 show procedure similar to the step 2 through step 6 in which five thousand yen bill is taken by a set of one hundred of the bill out of the money case 20. In step 7, the quantity of the bill in the money case 20 is less than one hundred eight, the step 12 is carried out. In this case, the controller 60 judges as to whether the quantity of one thousand yen bill stored in the money case 21 for one thousand yen bill is not more than one hundred eight.

Step 12 through step 16 show a procedure similar to the step 2, in which the bills in the money case 21 are taken out thereof by a set of one hundred of the bill.

When the quantity of the bill stored in the respective money cases 19, 20 and 21 are less than one hundred eight, the controller carries out step 17.

In step 17, the controller 60 judges as to whether there are bills in the money receiving and disbursing box 43. If the judgement is yes, the controller 60 carries out step 18 and if no, the controller carries out step 31.

In step 18, the controller 60 is caused to pick the bills out of the box 43 and distribute the bills to the money cases 19, 20 and 21 through the money disbursing route 55, transfer route 58, discriminating route 10, distributing route 13 wherein one of the routes is provided by means of the forks 15, 16, 17 which are selectively operated based on a result of discrimination of bill passing through the discriminating section 11. the quantity of the bill stored in the respective money cases 19, 20 and 21 from the money receiving and disbursing box 43 are detected and fed to the memory of the controller 60 Steps 18, 19). The controller 60 judges as to whether the quantity of the bill stored in the respective money cases 19, 20 and 21 are more than one hundred eight (Steps 20, 21 and 22).

The controller 60 is caused to transfer the bills to the transaction window device 2 as a set of one hundred of the bill of corresponding denominations.

In step 31, the controller 60 judges as to whether the quantity of the bill in the money case 19 for ten thousand yen bill is more than one hundred which is minimum quantity for providing the set of the bill to be adjusted. If this judgement is no, step 36 is carried out and if yes, next step 32 is carried out. In step 32, the controller 60 is caused to pick out the bills by the quantity of one hundred from the money case 19 (Step 32, 33) and to transfer the bills to the money storing section 3 as a set of one hundred to be taken out.

Similar procedures to the steps 32 through 35 are made as to five thousand yen bill and one thousand yen bill in steps 36 through 40 and steps 41 through 45 respectively.

In step 46, the controller 60 judges as to whether a sum of quantity stored in the money cases 19 and 20 is more than one hundred eight. If the judgement is yes, the controller 60 carries out step 47. If no, step 51 is carried out. The controller 60 is caused to pick out the bills from the money cases 19 and 20 by one hundred as a sum of ten thousand yen bill and five thousand yen bill. In step 51, the controller 60 judges whether or not a sum of the quantity of the bill stored in the money cases 19, 20 and 21 with regard to ten thousand yen bill, five thousand yen bill and one thousand yen bill is more than one hundred eight. If the judgement is yes, the controller 60 is caused to transfer the bills to the money storing section 3 for dispensing. In steps 56 through 60, a similar procedure to the steps 46 through 50 and steps 51 through 55 is carried out wherein the controller 60 judges whether or not a sum of the quantity of the bill stored in the money cases 19, 20 and 21 is more than one hundred and dispenses the bills by one hundred if the judgement is yes.

In step 61, the controller judges whether or not there are any bills left in the money cases 19, 20 and 21. If the judgement is yes, the controller 60 is caused to dispense the bills through the money storing section 3(Step 62). If no, the operation is finished (Step 63).

According to the above control in the money receiving and disbursing machine 1, the bills stored in the machine 1 can be dispensed by a set of one hundred of the bill with regard to respective denominations such as ten thousand yen bill, five thousand yen bill and one thousand yen bill by only turning the completion switch 63 on at any time such as the end of the daily work in a banking facilities for adjustment of the money.

This means that there is no need for a work for adjusting the money and therefore the money adjusting work can be efficient to shorten the time for the work.

At a first stage of the control, the quantity of the bill in the money cases 19, 20 21 are judged with regard to a quantity including a predetermined allowance (eight in this embodiment) in addition to an exact quantity for obtaining a set of the bill (one hundred in the embodiment) to be dispensed to thereby make sure the money adjusting operation in the machine 1 in making the set of the bill. The bills are dispensed by the set of the bill from the respective money cases 19, 20 and 21 of corresponding denominations. In this case, after this process, the controller 60 is caused to distribute the bills in the money receiving and disbursing box 43 to the money cases 19, 20 and 21 of corresponding denominations.

At a second stage of the control, the controller 60 judges the quantity in the respective money cases 19, 20 and 21 with regard to the exact quantity of the set after the operation of the first stage.

At a third stage of the control, the controller 60 judges the quantity of the bill in the money cases 19, 20 and 21 with regard to the quantity including the allowance as a total quantity of the bill in the money cases 19, 20 and 21 and is caused to dispense a set of the bill including two or more denominations.

At a forth stage of the control, the controller 60 judges the quantity of the bill in the money cases 19, 20 and 21 with regard to the exact quantity for making the set of the bill as a total quantity of the bill in the money cases 19, 20 and 21 and is caused to dispense a set of the bill including two or more denominations.

The allowance is not limited to eight and can be determined taking account of various conditions of machine and/or bills circulating in the machine.

It will be apparent from the above description that many modifications and variations may be made by those skilled in the art without apart from the scope of the claimed invention as attached.

We claim:

1. A money receiving and disbursing machine comprising a plurality of money case means for storing bills so that each money case means stores bills of different denomination from each other, money receiving and disbursing box means for receiving and storing bills irrespective of their denominations, said money receiving and disbursing box means being adapted for storing bills so that the bills can be taken out therefrom one by one, distributing means for distributing bills received by the money receiving and disbursing machine to the plurality of money case means and the money receiving and disbursing box means, disbursing means for disbursing bills stored in the money case means and the money receiving and disbursing box means through transaction window means and transfer means for transferring bills stored in the money receiving and disbursing box means to the money case means in accordance with their denominations, switch means for initiating a counting and adjusting operation of the money receiving and disbursing machine, said disbursing means includes first pick-out means for taking out bills stored in the plurality of money case means in the case where the number of bills is more than a predetermined value in at least one money case means after the switch means was turned on, first discriminating means for discriminating the bills taken out from the money case means, said disbursing means further includes second pick-out means for taking out bills stored in the money receiving and disbursing box means in the case where the number of bills is not more than the predetermined value in any money case after the switch means is turned on, second discriminating means for discriminating the bills taken out from the money receiving and disbursing box means, said disbursing means conveying genuine bills taken out from the money case means to the transaction window means and counterfeit bills taken out from the money case means to reject means based upon a discrimination result of the first discriminating means, said transfer means conveying genuine bills taken out from the money receiving and disbursing box means to the money case means in accordance with their denomination and counterfeit bills to the reject means based upon a discrimination result of the second discriminating means, and control means for enabling said first pick-out means to take out bills from the money case means in the case where it judges that the switch means was turned on and the number of bills is more than the predetermined value in at least one money case means, for enabling said second pick-out means to take out bills from said money receiving and disbursing box means in the case where it judges that the switch means was turned on and the number of bills is not more than the predetermined value in any money case means, for counting the genuine bills conveyed by said disbursing means to enable the first pick-out means to stop taking out bills from the money case means when it judges that the number of bills conveyed by the disbursing means to the transaction window means becomes equal to a preset number of bills to be collected as a set from the money receiving and disbursing machine and counting the number of bills transferred from said money receiving and disbursing box means to the money case means to enable the second pick-out means to stop taking out bills from the money receiving and disbursing box means when it judges that the number of bills transferred from the money receiving and disbursing box means to one of said plurality of money case means becomes equal to said number of bills of predetermined value.

2. A machine in accordance with claim 1, wherein the number of bills of predetermined value includes a predetermined allowance in addition to the exact preset number for said set of the bills to be collected.

3. A machine in accordance with claim 2, wherein the number of bills of predetermined value is between one hundred one and one hundred eight.

4. A machine in accordance with claim 2, wherein the control means enables said transfer means to transfer bills in the money receiving and disbursing box means to the plurality of money case means when the number of the bills in the money case means is more than the exact number of the set of bills to be collected but not more than the number of bills of predetermined value.

5. A machine in accordance with claim 2, wherein the control means actuates the first pick-out means to take out the bills from the plurality of money case means when the total number of bills in the plurality of money case means is more than the exact number of the set of bills to be collected but not more than the number of bills of predetermined value.

6. A machine in accordance with claim 2, wherein the control means actuates the first pick-out means to take out the bills from the plurality of money case means when a total number of the bills in at least two of the plurality of money case means is more than the exact number of the set of bills to be collected but not more than the number of bills of predetermined value.

7. A machine in accordance with claim 2, wherein the control means actuates the first pick-out means to take out the bills from the plurality of money case means when a total number of the bills in at least two of the plurality of money case means is not more than the exact number of the set of bills to be collected.

* * * * *